Dec. 4, 1951  B. R. HALL  2,577,579
COLLAPSIBLE CART

Filed May 5, 1945  2 SHEETS—SHEET 1

INVENTOR.
BERTIE R. HALL
BY Charles O. Bruce
ATTORNEY

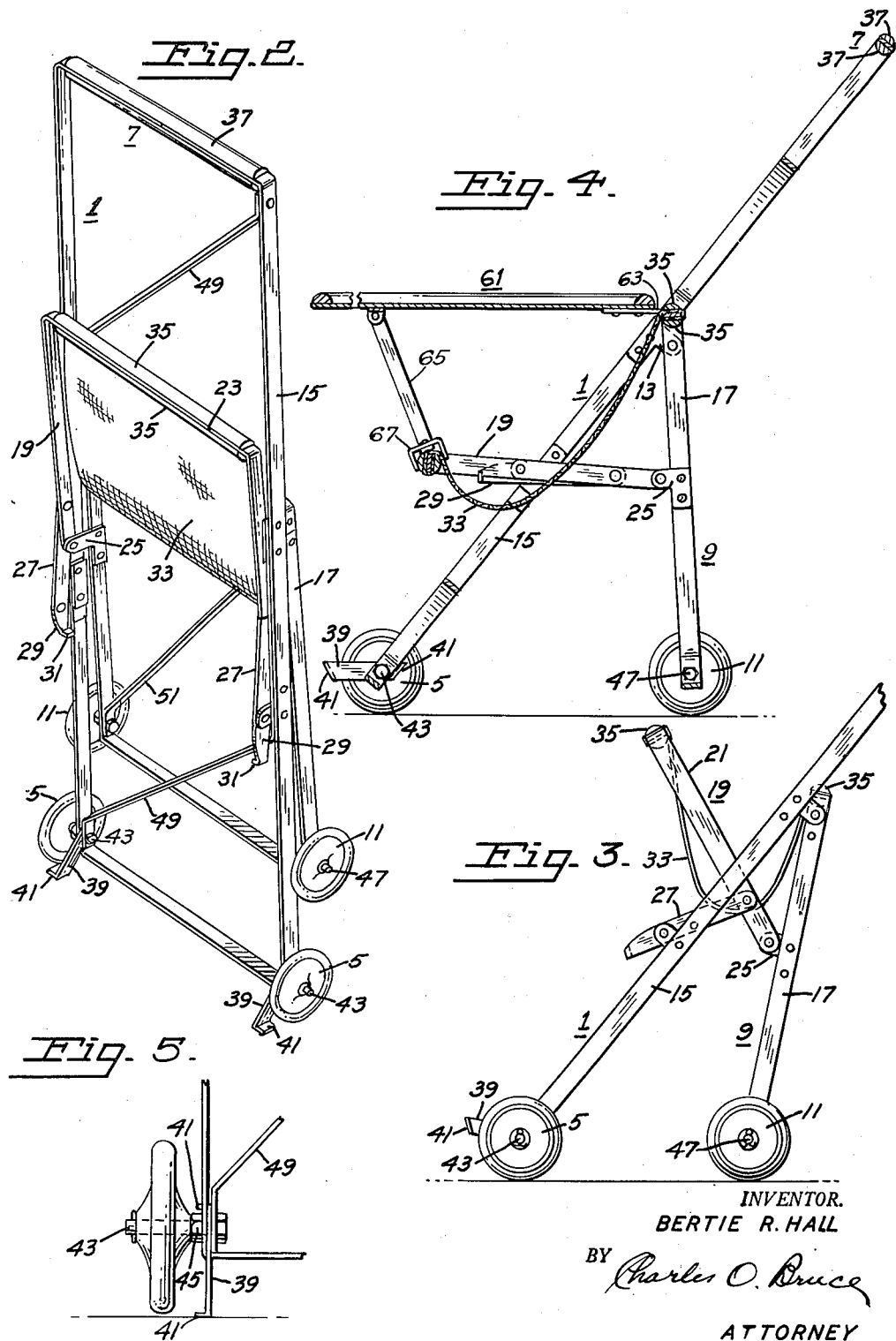

Patented Dec. 4, 1951

2,577,579

UNITED STATES PATENT OFFICE 2,577,579

COLLAPSIBLE CART

Bertie R. Hall, Berkeley, Calif.

Application May 5, 1945, Serial No. 592,125

6 Claims. (Cl. 280—41)

My invention relates to collapsible carts, and more particularly to one of the type conventionally referred to as a go-cart.

Among the objects of my invention are:

(1) To provide a novel and improved collapsible cart;

(2) To provide a novel and improved collapsible cart of simple and rugged design;

(3) To provide a novel and improved cart capable of being collapsed into a thin assembly to facilitate portability thereof;

(4) To provide a novel and improved collapsible cart of light weight and designed for under-the-arm portability in its collapsed condition;

(5) To provide a novel and improved collapsible cart adapted for use as a utility cart aside from its function as a go-cart.

Additional objects of my invention will be brought out in the following description of a preferred embodiment of the same, taken in conjunction with the accompanying drawings wherein—

Figure 2 is a view in perspective of the cart of Figure 1 in its collapsed condition;

Figure 3 is a side elevational view of the cart of Figure 1 in the process of being collapsed;

Figure 4 is a longitudinal section through the cart of Figure 1, as converted to use as a serving table;

Figure 5 is a detail showing a wheel and rest assembly;

Figure 1:
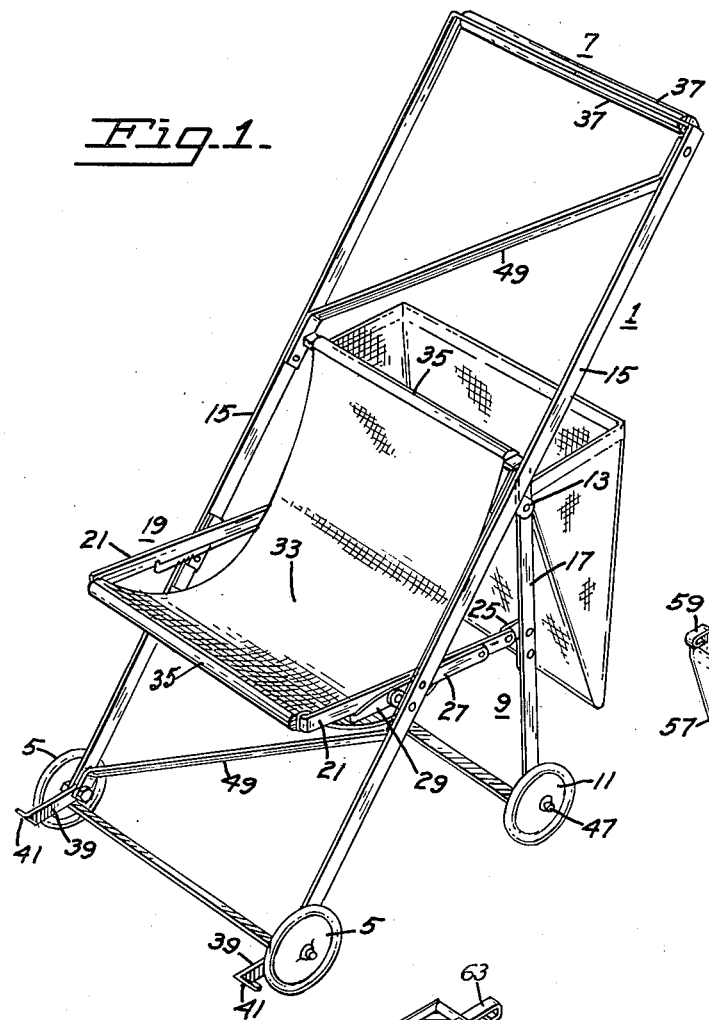
Figure 1 is a view in perspective of the preferred embodiment of my invention in the form of a go-cart with a removable shopping bag attachment.
Figure 6:
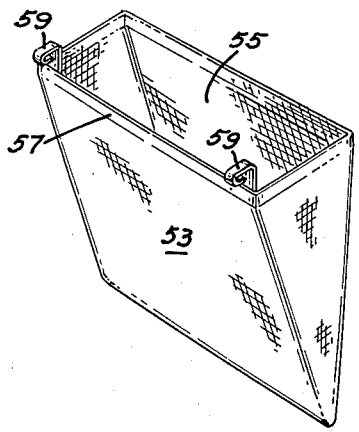
Figure 6 is a view in perspective of a shopping or utility bag adapted for use with the cart as illustrated in Figure 1.
Figure 7:
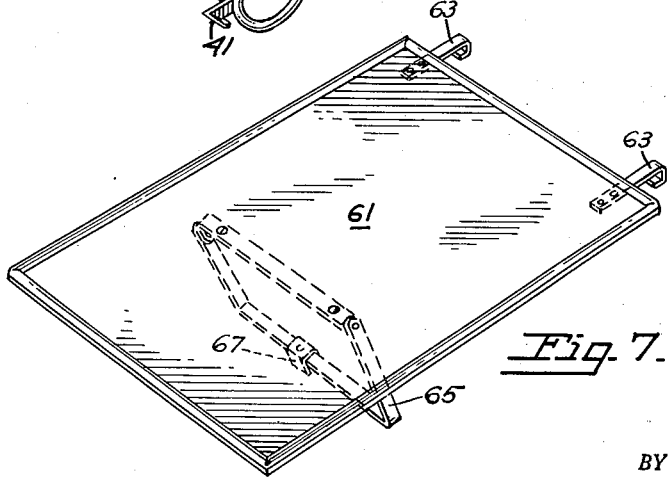
Figure 7 is a view in perspective of a tray designed for use with the cart of Figure 1 in converting the same to a serving table.

Referring to the drawings for a more detailed description of the preferred embodiment of my invention as illustrated therein, the cart includes a main frame 1, one end of which, namely the lower end, is to carry the front wheels 5, whereas the other or upper end is to carry the handle 7.

This main frame is preferably formed of a strip of metal bent into a rectangle, with the ends of the strip substantially meeting at the middle of the handle end of the frame.

A rear frame 9 adapted to carry the rear wheels 11 at the lower end thereof, is pivotally secured adjacent its opposite end, to the main frame, at an intermediate location on the main frame.

This rear frame, like the main frame, is preferably formed from strip metal bent into the form of a rectangle, with the ends of the strip substantially meeting at the middle of an end of this frame, preferably opposite that end carrying the rear wheels.

In effecting the pivotal connection of the rear frame 9 to the main frame 1, I prefer to affix a planar bracket 13 to the inner surface of each of the longer sides 15 of the main frame, these brackets extending toward the rear and being perforated to provide for pivot connections to the sides 17 of the rear frame, the width of the rear frame being such as to just permit the same to fit between the planar brackets 13.

A seat frame 19, preferably formed of strip metal like the main frame 1 and rear frame 9, includes two sides 21 and an inter-connecting end 23. This seat frame is hinged or pivoted to the rear frame 9 at some intermediate location, for example, approximately half-way between the ends thereof, the pivot connection being provided, preferably, by a pair of planar brackets 25 affixed to the sides of the rear frame 9 and extending toward the front or main frame 1.

The permissible angle of spread between the main frame and the rear frame in the open condition of the cart is determined by a link 27 at each side of the seat frame 19 and pivoted to a side thereof at one end of the link, and to the main frame or preferably a planar bracket affixed to the main frame, at such a point that with the main frame and rear frame open to their maximum permissible angle of spread, the links will lie in substantially a horizontal plane.

Under these conditions, the seat frame is permitted to drop to a horizontal position in approximately the same plane as the links, and there restrained against further downward movement by a forward extension 29 on each link, such extensions having their ends turned in toward each other to form abutments 31 which may, if desired, be notched for engagement by the seat frame.

The seat 33 of the cart is preferably of fabric suspended between the upper end of the rear frame 9 and the end 23 of the seat frame. In effecting such suspension, the material is wrapped about the suspending portion of the respective frames and fixed thereto by a substantially semi-cylindrical strip 35 of wood or other suitable material on either side thereof, held together by rivets or bolts (not shown) through the assembly. The strips 35 applied to the rear frame, serve to clamp and hold the otherwise loose ends of the metal strip from which the frame is formed.

The handle of the cart is similarly formed by the application of a substantially semi-cylindrical strip 37 of wood or other suitable material applied to each side of the end section of the main frame 1, these strips, like the corresponding strips 35 of the rear frame, serving to clamp and hold the ends of the metal strip from which the main frame is formed.

A rest element, comprising a short strip 39 of metal having an angularly disposed, laterally extending tab 41 at each end, is disposed in each lower corner of the main frame 1, with one of the tabs in snubbing engagement with the adjacent side 15 of the main frame. In this position, it is fixed by a bolt 43 passing through the strip 39 and the lower end of one of the main frame sides and locked therein by a lock nut 45 to provide a spindle for the mounting of one of the front wheels 5. In a similar manner, the rear wheels 11 are applied to the rear frame 9, that is through the use of a bolt 47 anchored to each side of the rear frame adjacent the lower corners thereof to provide spindles for the mounting of such wheels.

The entire cart assembly is strengthened by a pair of cross-braces 49 in the main frame and a corresponding cross-brace 51 in the rear frame, the rear frame brace and the lower brace of the main fame being anchored in a lower corner by the stub shaft of one of the wheels.

The cart as thus constructed, forms a very light-weight device of more than ample rigidity for its intended purpose, and one which is capable of being collapsed into a thin assembly.

When so collapsed, the nature of the construction is such that the seat frame, for the first few degrees of its opening movement, resists opening to an extent which precludes accidental opening of its own accord, even when the cart in its collapsed condition is tilted in the direction of opening. This is believed attributable to the fact that each of the links 27 in its association with the rest of the assembly, respresents an approach to a toggle arrangement.

Thus, the fact that the seat frame tends to maintain its collapsed status, even when tilted in the direction of opening, renders it feasible to dispose the collapsed cart against some supporting structure, such as a wall, when not in use. In this connection, the rest elements 39—41 establish contact with the floor and provide a non-skid support for the cart.

To enhance portability of the cart in its collapsed condition, it is preferably designed so that when carried with the handle in the crotch of the arm, by the average adult, the upper end of the rear frame will be within easy grasp of the hand, and the rest elements will be out of engagement with the floor or ground, thus permitting it to be carried with ease and a minimum of tiring effort.

In applying the seat-holding strips 35 to the upper end of the rear frame, I preferably, and for a definite purpose, leave a portion of the frame material exposed at each end of the strips. These exposed portions provide anchorage for certain utility auxiliaries which I have developed for use with the cart.

A shopping bag 53, as one example, preferably constructed of a cloth-covered frame formed with a rectangular opening 55, is provided along one of the longer sides 57 of the opening with a pair of hooks 59 shaped with a reverse bend to slide over the aforementioned exposed portions of the rear frame and cause the bag to receive support therefrom. In this connection, it is noted that the bag does not interfere with use of the device as a go-cart, and with the cart in its collapsed condition, as may be the situation in boarding a bus or street car, it provides a convenient means for carrying the shopping bag and its contents without having to disturb the same.

Aside from its aforementioned uses, the cart above described, readily lends itself to conversion into a tea wagon through the application thereto of a simple tray 61 which I have developed for the purpose. Along one edge, a pair of hooks 63 similar to those 59 on the bag 53, are affixed for engaging the exposed portions of the rear frame adjacent the ends of the strips 35, and from the undersurface of the tray, I provide a hinged supporting frame 65 having at its lower end, a yoke 67 for engaging and straddling the front edge of the seat. Through this simple expedient, the go-cart may be readily converted into a tea wagon for use in the home when the need for a go-cart becomes unnecessary.

From the above description of a preferred embodiment of my invention, it is apparent that the same is subject to modification and alteration without departing from the basic features thereof, and I accordingly do not desire to be limited in my protection to the specific details disclosed, except as may be necessitated by the appended claims.

I claim:

1. A collapsible go-cart comprising a main frame having a handle at one end and a pair of wheels at the opposite end; a rear frame having a pair of wheels at one end and a cross-bar at its other end; means pivotally securing said rear frame to said main frame at an intermediate location thereof with the cross-bar of said rear frame approximately arm's length from said handle in the collapsed condition of said go-cart; a seat frame pivotally connected to said rear frame; and link means interconnecting said seat frame and said main frame to limit the maximum permissible angle of spread between said main frame and rear frame, said link means including extensions directed toward each other to support said seat frame in a substantially horizontal position when said cart is in open condition.

2. A collapsible go-cart comprising a main frame including a metal strip bent into a rectangle with the ends of said strip approaching each other at one end of said frame, a strip of material bridging said approaching ends to form a handle; a pair of wheels at the opposite end of said frame; a rear frame similarly constructed and having a pair of wheels at one end; and means pivotally securing said rear frame at its opposite end to said main frame at an intermediate location thereof with the opposite end of said rear frame approximately arm's length from said handle.

3. A collapsible go-cart comprising a main frame of substantially rectangular shape having a pair of wheels at one end and a handle at the other end; a rear frame of substantially rectangular shape having a pair of wheels at one end; means pivotally securing said rear frame adjacent its other end to an intermediate location on said main frame with said other end approximately an arm's length from said handle; a seat frame; means pivotally securing said seat frame to said rear frame; and a link at each side of said seat frame pivotally connected at one point to such side of said seat frame, and at another point to said main frame to limit the permissible angle of spread between said main and rear frames, each of said links having a forward extension in the path of downward movement of said seat frame to be engaged thereby and fix its supporting position; and a layer of fabric suspended between the front edge of said seat frame and said other end of said rear frame to provide a seat.

4. A collapsible go-cart comprising a main frame of substantially rectangular shape having a pair of wheels at one end and a handle at the other end; a rear frame of substantially rectangular shape having a pair of wheels at one end; means pivotally securing said rear frame adjacent its other end to an intermediate location on said main frame with said other end approximately an arm's length from said handle; a seat frame; means pivotally securing said seat frame to said rear frame; and a link at each side of said seat frame pivotally connected at one point to such side of said seat frame, and at another point to said main frame to limit the permissible angle of spread between said main and rear frames, each of said links having a forward extension in the path of downward movement of said seat frame to be engaged thereby and fix its supporting position; and a utility auxiliary having a pair of hooks along one side adapted for engagement with said other end of said rear frame to provide an anchoring support therefor.

5. A collapsible go-cart comprising a main frame of substantially rectangular shape having a pair of wheels at one end and a handle at the other end; a rear frame of substantially rectangular shape having a pair of wheels at one end; means pivotally securing said rear frame adjacent its other end to an intermediate location on said main frame with said other end approximately an arm's length from said handle; a seat frame; means pivotally securing said seat frame to said rear frame; and a link at each side of said seat frame pivotally connected at one point to such side of said seat frame, and at another point to said main frame to limit the permissible angle of spread between said main and rear frames, each of said links having a forward extension in the path of downward movement of said seat frame to be engaged thereby and fix its supporting position; a layer of fabric suspended between the front edge of said seat frame and said other end of said rear frame to provide a seat; and a utility auxiliary having anchoring means for removably securing said auxiliary to said other end of said rear frame.

6. In combination, a collapsible go-cart comprising a main frame having a handle at one end and a pair of wheels at the other end; a rear frame having a pair of wheels at one end; means pivotally securing said rear frame to said main frame at an intermediate location; a seat supported by said main frame and rear frame; and a utility tray having means at one end for anchoring the same to said opposite end of said rear frame, said tray including a supporting frame hinged to the underside of said tray and having a yoke at its lower end for straddling the front edge of said seat.

BERTIE R. HALL.

REFERENCES CITED

The following references are of record in the file of this patent:

UNITED STATES PATENTS

| Number | Name | Date |
|---|---|---|
| 75,373 | Collignon | Mar. 10, 1868 |
| 188,969 | Smith | Mar. 27, 1877 |
| 501,520 | Lyle | July 18, 1893 |
| 1,102,248 | Decker | July 7, 1914 |
| 1,482,146 | Pomilio | Jan. 29, 1924 |
| 1,614,763 | Rastetter | Jan. 18, 1927 |
| 1,695,409 | Banks | Dec. 18, 1928 |
| 1,698,698 | Hageman | Jan. 8, 1929 |
| 1,764,914 | Vande Mark | June 17, 1930 |
| 2,155,896 | Goldman | Apr. 25, 1939 |
| 2,234,358 | Schray | Mar. 11, 1941 |
| 2,377,198 | Winslow | May 29, 1945 |

FOREIGN PATENTS

| Number | Country | Date |
|---|---|---|
| 8,660 | Great Britain | Apr. 10, 1909 |
| 335,942 | France | Dec. 22, 1903 |